United States Patent
Kondo et al.

(10) Patent No.: US 12,235,099 B2
(45) Date of Patent: Feb. 25, 2025

(54) AXIAL DEVIATION ESTIMATING DEVICE

(71) Applicant: DENSO CORPORATION, Kariya (JP)

(72) Inventors: Katsuhiko Kondo, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 17/658,389

(22) Filed: Apr. 7, 2022

(65) Prior Publication Data

US 2022/0228862 A1 Jul. 21, 2022

Related U.S. Application Data

(63) Continuation of application No. PCT/JP2020/036966, filed on Sep. 29, 2020.

(30) Foreign Application Priority Data

Oct. 9, 2019 (JP) .................................. 2019-186313

(51) Int. Cl.
  *G01B 15/02* (2006.01)
  *G01B 11/06* (2006.01)
  *G01S 13/931* (2020.01)

(52) U.S. Cl.
  CPC .......... *G01B 15/02* (2013.01); *G01B 11/0608* (2013.01); *G01S 13/931* (2013.01)

(58) Field of Classification Search
  CPC ........................ G01B 11/0608; G01S 13/931
  See application file for complete search history.

(56) References Cited

U.S. PATENT DOCUMENTS

| | | | |
|---|---|---|---|
| 6,122,040 A | 9/2000 | Arita et al. | |
| 9,575,170 B2* | 2/2017 | Kurono | G01S 13/42 |
| 2002/0189875 A1 | 12/2002 | Asanuma et al. | |
| 2011/0068970 A1 | 3/2011 | Mitsumoto | |
| 2014/0062762 A1 | 3/2014 | Kurono et al. | |
| 2016/0124076 A1 | 5/2016 | Nakatani et al. | |
| 2016/0291132 A1 | 10/2016 | Goto et al. | |
| 2017/0363718 A1 | 12/2017 | Ishimori | |
| 2019/0101621 A1* | 4/2019 | Machida | G01S 13/931 |

(Continued)

FOREIGN PATENT DOCUMENTS

| | | |
|---|---|---|
| JP | 2002-228749 A | 8/2002 |
| JP | 2014-089114 A | 5/2014 |

(Continued)

*Primary Examiner* — Vladimir Magloire
*Assistant Examiner* — Eric K Hodac
(74) *Attorney, Agent, or Firm* — Maschoff Brennan

(57) ABSTRACT

This axial deviation estimating device estimates an axial deviation angle of a radar device mounted on a mobile body, and includes an acquiring unit, an extracting unit, a device-system coordinates unit, and an estimating unit. The estimating unit estimates an axial deviation angle using a relational expression. The relational expression is an expression that holds between at least one unknown parameter, which includes an axial deviation angle of a coordinate axis of the radar device about a target axis which is at least one of a horizontal axis and a traveling direction axis constituting the coordinate axes of the mobile body, and at least one element included in the device-system coordinates of a road surface reflection point.

10 Claims, 11 Drawing Sheets

(56) References Cited

U.S. PATENT DOCUMENTS

2019/0219673 A1    7/2019  Morinaga et al.
2019/0312134 A1   10/2019  Ikura et al.

FOREIGN PATENT DOCUMENTS

| JP | 2021-060370 A | 4/2021 | | |
|---|---|---|---|---|
| JP | 2021-060371 A | 4/2021 | | |
| WO | WO-2018056441 A1 * | 3/2018 | ........... | G01S 13/931 |

* cited by examiner

AXIAL DEVIATION ESTIMATING DEVICE

CROSS-REFERENCE TO RELATED APPLICATION

This application is the U.S. bypass application of International Application No. PCT/JP2020/036966 filed on Sep. 29, 2020 which designated the U.S. and claims priority to Japanese Patent Application No. 2019-186313 filed on Oct. 9, 2019, the contents of both of which are incorporated herein by reference.

TECHNICAL FIELD

The present disclosure relates to a technique of estimating an axial deviation angle of a radar device that detects the direction and relative speed of an object.

BACKGROUND

In vehicle-mounted radar devices, so-called axial deviation may occur in which the central axis of a radar beam somehow becomes deviated due to a change in the installation state. For example, JP 6321448 B2 discloses a technique that estimates the axial deviation angle of a vehicle-mounted radar device based on the fact that the reception intensity of a reflected wave from near the vehicle reaches a maximum when an axial deviation occurs.

SUMMARY

An aspect of the present disclosure is an axial deviation estimating device that estimates the axial deviation angle of a radar device mounted on a mobile body. The axial deviation estimating device includes an acquiring unit, an extracting unit, a device-system coordinates unit, and an estimating unit.

The acquiring unit acquires, for each of a plurality of reflection points detected by the radar device, reflection point information including at least a horizontal angle and a vertical angle, which are azimuth angles of the reflection point that are obtained with reference to a beam direction, and a distance between the radar device and the reflection point. The beam direction is the direction along the central axis of the radar beam. The extracting unit extracts, based on at least the reflection point information, at least one road surface reflection point from among the plurality of reflection points that have been detected due to reflection by the road surface.

The device-system coordinates unit specifies, based on the reflection point information, device-system coordinates for each road surface reflection point that represent three-dimensional coordinates based on a coordinate axis of the radar device. The estimating unit estimates an axial deviation angle using a relational expression. The relational expression is an expression that holds between at least one unknown parameter, which includes the axial deviation angle of a coordinate axis of the radar device from a target axis which is one of a horizontal axis and a traveling direction axis constituting the coordinate axes of the mobile body, and at least one element included in the device-system coordinates of the road surface reflection point.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

As a result of detailed investigation, the inventors have found a problem in the conventional device described in JP 6321448 B2 in that the estimation accuracy of the axial deviation angle decreases when an object having a large reflection intensity such as a manhole exists far from the vehicle.

An object of the present disclosure is to provide a technique that improves the estimation accuracy of the axial deviation angle.

An aspect of the present disclosure is an axial deviation estimating device that estimates the axial deviation angle of a radar device mounted on a mobile body. The axial deviation estimating device includes an acquiring unit, an extracting unit, a device-system coordinates unit, and an estimating unit.

The acquiring unit acquires, for each of a plurality of reflection points detected by the radar device, reflection point information including at least a horizontal angle and a vertical angle, which are azimuth angles of the reflection point that are obtained with reference to a beam direction, and a distance between the radar device and the reflection point. The beam direction is the direction along the central axis of the radar beam. The extracting unit extracts, based on at least the reflection point information, at least one road surface reflection point from among the plurality of reflection points that have been detected due to reflection by the road surface.

The device-system coordinates unit specifies, based on the reflection point information, device-system coordinates for each road surface reflection point that represent three-dimensional coordinates based on a coordinate axis of the radar device. The estimating unit estimates an axial deviation angle using a relational expression. The relational expression is an expression that holds between at least one unknown parameter, which includes the axial deviation angle of a coordinate axis of the radar device from a target axis which is one of a horizontal axis and a traveling direction axis constituting the coordinate axes of the mobile body, and at least one element included in the device-system coordinates of the road surface reflection point.

As a result, because the axial deviation estimating device arithmetically estimates the axial deviation angle, it is possible to suppress the estimation error of the axial deviation angle compared to the conventional device, which estimates the axial deviation angle based on the fact that the reception intensity of the reflected wave from near the vehicle reaches a maximum when an axial deviation angle occurs.

Hereinafter, exemplary embodiments of the present disclosure will be described with reference to the drawings. Note that the term "vertical" used below is not limited to a strict meaning of "vertical", and does not strictly have to be "vertical" as long as the same effect is achieved. The same applies the terms "horizontal" and "matching" used below.

1. First Embodiment 1-1. Configuration

Figure 1:
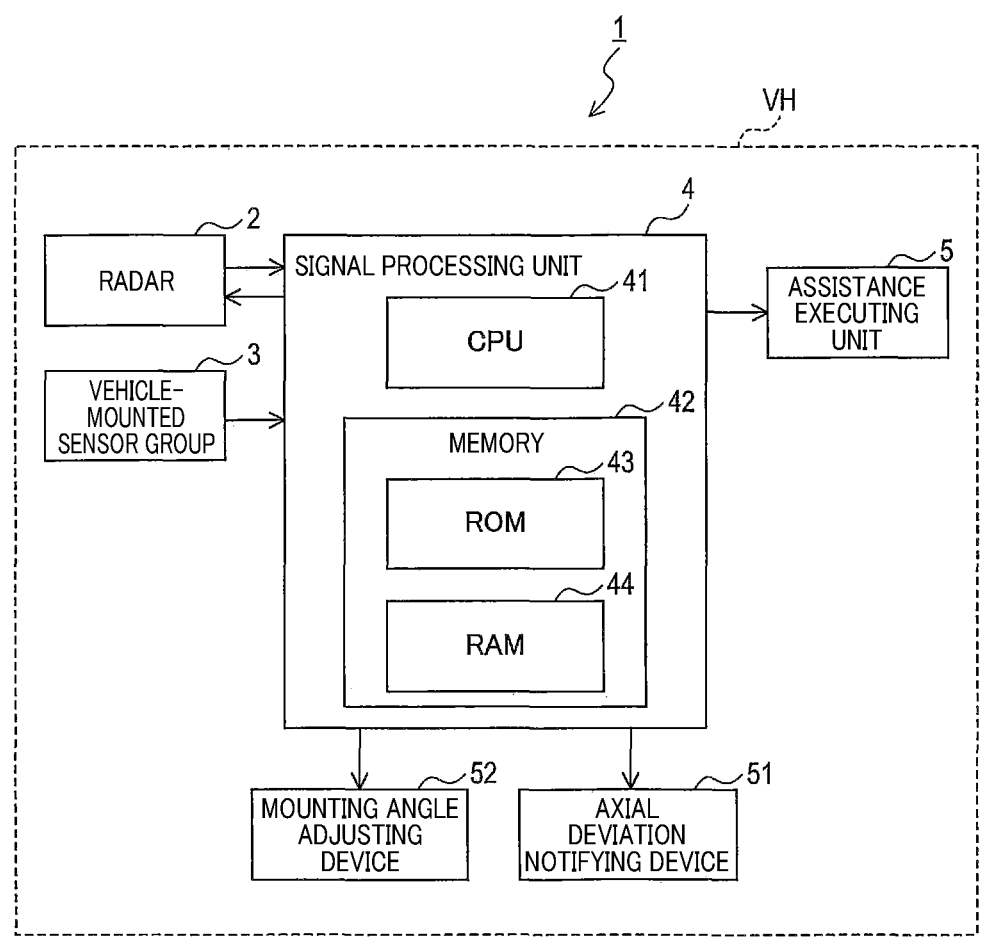
FIG. 1 is a block diagram showing a configuration of a vehicle control system.

The vehicle control system 1 shown in FIG. 1 is a system mounted on a vehicle VH, which is a mobile body. The vehicle control system 1 includes a radar device 2, a vehicle-mounted sensor group 3, a signal processing unit 4, and an assistance executing unit 5. Furthermore, the vehicle control system 1 may include an axial deviation notifying device 51 and a mounting angle adjusting device 52. Hereinafter, the vehicle VH in which the vehicle control system 1 is mounted is also referred to as the own vehicle VH. Moreover, the vehicle width direction of the own vehicle VH is also referred to as the horizontal direction, and the vehicle height direction is also referred to as the vertical direction.

Figure 2:
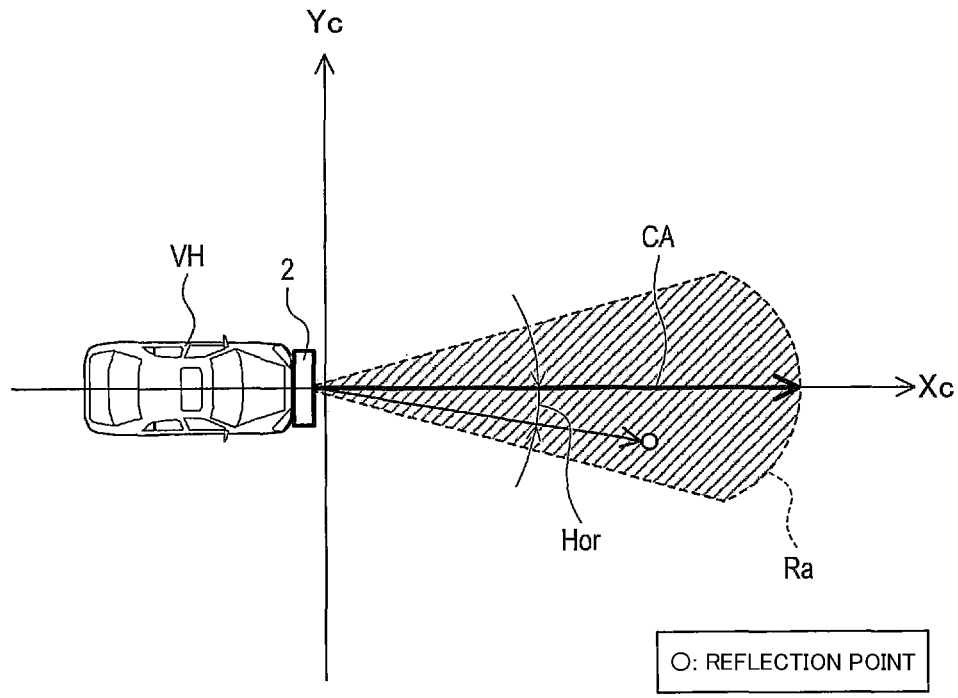
FIG. 2 is an explanatory diagram illustrating an irradiation range of a radar wave in the horizontal direction.
Figure 3:
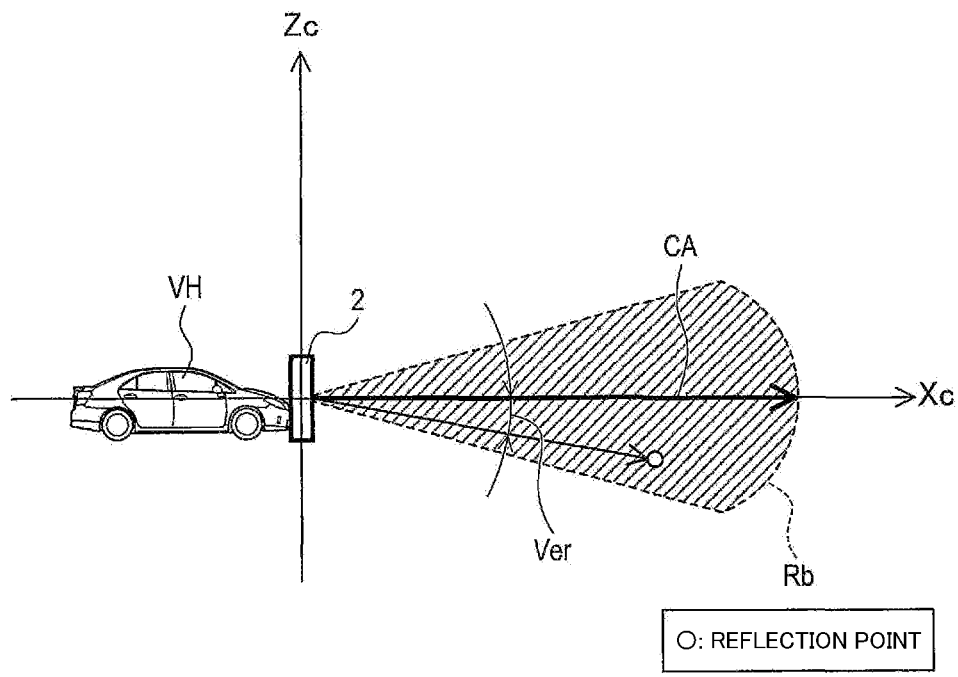
FIG. 3 is an explanatory diagram illustrating an irradiation range of a radar wave in the vertical direction.

As shown in FIG. 2 and FIG. 3, the radar device 2 is mounted on the front side of the own vehicle VH. The radar device 2 transmits radar waves within a predetermined angle range Ra in the horizontal direction in front of the own vehicle VH, and within a predetermined angle range Rb in the vertical direction in front of the own vehicle VH. The radar device 2 receives a reflected wave of a transmitted radar wave to generate reflection point information relating to the reflection points reflecting the radar wave.

The radar device 2 may be a so-called millimeter-wave radar that uses an electromagnetic wave in the millimeter wave band as the radar wave, a laser radar that uses laser light as the radar wave, or a sonar that uses a sound wave as the radar wave. In any case, the antenna unit that transmits and receives radar waves is configured to be capable of detecting the arrival direction of the reflected wave in both the horizontal direction and the vertical direction. The antenna unit may include an array antenna arranged in the horizontal direction and the vertical direction.

The radar device 2 is installed such that the beam direction matches the front-rear direction, that is, the traveling direction of the own vehicle VH, and is used to detect various targets that are in front of the own vehicle VH. The beam direction is the direction along the central axis CA direction of the transmitted radar beam.

The reflection point information generated by the radar device 2 includes at least an azimuth angle of the reflection point, and a distance to the reflection point. The distance to the reflection point is the distance between the radar device 2 and the reflection point. The radar device 2 may be configured to detect the relative speed of the reflection point with respect to the own vehicle VH, and the reception intensity of the radar beam reflected by the reflection point. In the reflection point information, the reflection point may include the relative speed and the reception intensity.

As shown in FIGS. 2 and 3, the azimuth angle of the reflection point is at least one of a horizontal direction angle (hereinafter referred to as horizontal angle) Hor and a vertical direction angle (hereinafter referred to as vertical angle) Ver at which the reflection point exists, which are obtained with reference to the beam direction being the direction along the central axis CA of the radar beam. In the present embodiment, both the vertical angle Ver and the horizontal angle Hor are included in the reflection point information as information representing the azimuth angle of the reflection point.

Figure 4:
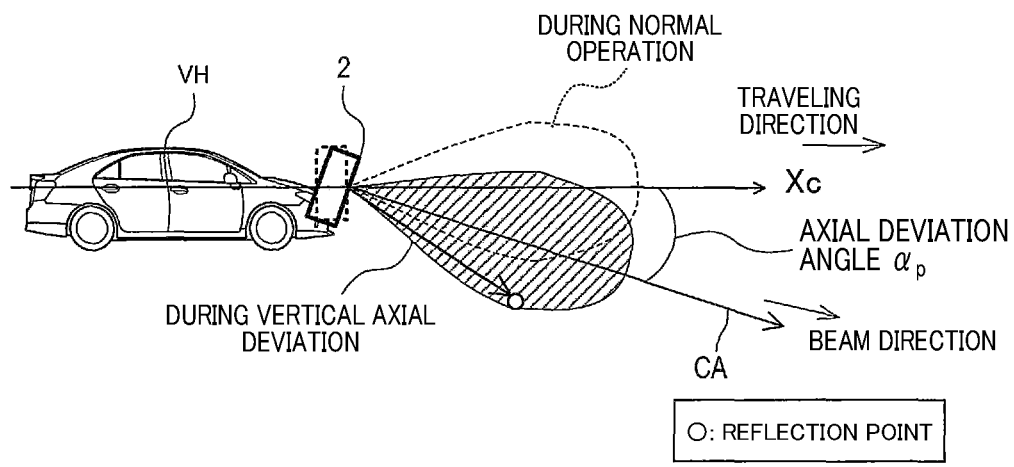
FIG. 4 is an explanatory diagram illustrating an axial deviation of a radar device.

FIG. 4 shows a state where a vertical axial deviation, that is, an axial deviation about the left-right axis of the radar device 2, has occurred. An axial deviation refers to the deviation in the coordinate axes of the radar device 2 when the radar device 2 is actually installed on the own vehicle VH, relative to the coordinate axes of the radar device 2 when the radar device 2 is accurately installed on the own vehicle VH. The axial deviation angle represents the magnitude of such an axial deviation.

Figure 5:
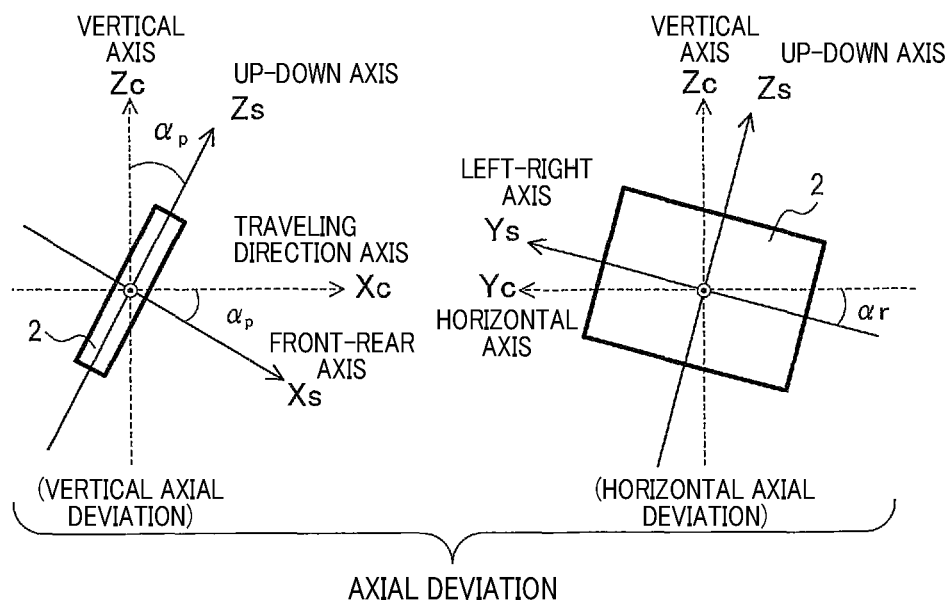
FIG. 5 is an explanatory diagram illustrating a vertical axial deviation angle and a roll angle.

Here, as shown in FIG. 5, the coordinate axes of the radar device 2 refer to an up-down axis Zs extending up and down from the radar device 2, a left-right axis Ys extending left and right from the radar device 2, and a front-rear axis Xs extending forward and backward from the radar device 2 in a state where the radar device 2 is installed on the own vehicle VH. The up-down axis Zs, the left-right axis Ys, and the front-rear axis Xs are perpendicular to each other. In the present embodiment, in which the radar device 2 is installed on the front of the own vehicle VH, the front-rear axis Xs is equivalent to the central axis CA.

On the other hand, the coordinate axes of the own vehicle VH refer to a vertical axis Zc, which is an axis extending in the vertical direction, a horizontal axis Yc, which is an axis extending in the horizontal direction, and a traveling direction axis Xc extending in the traveling direction of the own vehicle VH. The vertical axis Zc, the horizontal axis Yc, and the traveling direction axis Xc are perpendicular to each other.

For example, in the present embodiment, when the radar device 2 is accurately installed on the own vehicle VH, the central axis CA matches the traveling direction of the own vehicle VH as mentioned above. That is, when the radar device 2 is accurately installed on the own vehicle VH, the directions of the coordinate axes of the radar device 2 and the coordinate axes of the own vehicle VH match each other.

The axial deviation in the present embodiment includes a vertical axial deviation and a roll axis deviation.

Here, a vertical axial deviation refers to a state where a deviation has occurred between the up-down axis Zs, which is a coordinate axis of the radar device 2, and the vertical axis Zc, which is a coordinate axis of the own vehicle VH. The axial deviation angle when such a vertical axial deviation occurs is referred to as a vertical axial deviation angle αp. The vertical axial deviation angle αp represents a so-called pitch angle αp, and is the axial deviation angle of a coordinate axis (that is, the left-right axis Ys) of the radar device 2 about the horizontal axis Yc of the own vehicle VH. That is, the vertical axial deviation angle αp is the axial deviation angle when an axial deviation has occurred about the left-right axis Ys of the radar device 2. As is clear from FIG. 5, the vertical axial deviation αp can also be an angle representing the magnitude of the deviation between the front-rear axis Xs, which is a coordinate axis of the radar device 2, and the traveling direction axis Xc, which is a coordinate axis of the own vehicle VH.

On the other hand, a roll axial deviation refers to a state where a deviation has occurred between the left-right axis Ys, which is a coordinate axis of the radar device 2, and the horizontal axis Yc, which is a coordinate axis of the own vehicle VH. The axial deviation angle when such a roll axial deviation occurs is referred to as a roll angle αr. That is, the roll angle αr is the axial deviation angle of a coordinate axis (that is, the front-rear axis Xs) of the radar device 2 about the traveling direction axis Xc of the own vehicle VH. That is, the roll angle αr is the axial deviation angle when an axial deviation has occurred about the front-rear axis Xs of the radar device 2.

In the present embodiment, the radar device 2 adopts the FMCW method, in which a radar wave in an upstream-modulation section and a radar wave in a downstream-modulation section are alternately transmitted in a preset modulation cycle, and a reflected radar wave is received. FMCW is an abbreviation for Frequency Modulated Continuous Wave. In the present embodiment, in each modulation cycle, the radar device 2 detects as reflection point information the horizontal angle Hor and the vertical angle Ver, which are azimuth angles of the reflection point as mentioned above, the distance to the reflection point, the relative speed of the reflection point, and the received power of the received radar wave. Hereinafter, the received power of the received radar wave is referred to as the reflected power.

The vehicle-mounted sensor group 3 is at least one sensor mounted on the own vehicle VH in order to detect a state of the own vehicle VH and the like. The vehicle-mounted sensor group 3 may include a vehicle speed sensor. The vehicle speed sensor is a sensor that detects the vehicle speed based on the rotation of the wheels. Furthermore, the vehicle-mounted sensor group 3 may include a camera. The camera captures the same area as the irradiation area of the radar wave by the radar device 2. Moreover, the vehicle-mounted sensor group 3 may include an acceleration sensor. The acceleration sensor detects the acceleration of the own vehicle VH. Also, the vehicle-mounted sensor group 3 may include a yaw rate sensor. The yaw rate sensor detects the rate of change of the yaw angle, which represents the tilt of the traveling direction of the own vehicle VH with respect to the front of the own vehicle VH.

The signal processing unit 4 is provided with a microcomputer that includes a CPU 41, and semiconductor memory (hereinafter referred to as memory 42), such as a ROM 43, a RAM 44, and a flash memory. Various functions of the signal processing unit 4 are realized by the CPU 41 executing a program stored in a non-transitory tangible recording medium. In this example, the memory 42 corresponds to the non-transitory tangible recording medium storing the program. Furthermore, when the program is executed, the method corresponding to the program is executed. The number of microcomputers constituting the signal processing unit 4 may be one or more. Moreover, the method of realizing the various functions included in the signal processing unit 4 is not limited to software, and some or all of the elements may be realized by using one or more pieces of hardware. For example, when the above functions are realized by an electronic circuit, which is hardware, the electronic circuit may be realized by a digital circuit including a large number of logic circuits, an analog circuit, or a combination thereof.

The processing executed by the signal processing unit 4 includes at least target recognition processing and axial deviation estimation processing.

The target recognition processing detects, based on the reflection point information obtained from the radar device 2 and the various information obtained from the vehicle-mounted sensor group 3, the lane in which the own vehicle VH is traveling, a preceding vehicle traveling in the same lane as the own vehicle VH, and other vehicles and obstacles and the like. The processing result of the target recognition processing is output to the assistance executing unit 5 and the like.

The axial deviation estimation processing detects the axial deviation angle of the beam direction of the radar device 2 with respect to the traveling direction of the own vehicle VH. The details will be described later. The signal processing unit 4 that executes the axial deviation estimation processing corresponds to the axial deviation estimating device.

The assistance executing unit 5 controls the various vehicle-mounted devices based on the processing result of the target recognition processing executed by the signal processing unit 4, and executes a predetermined driving assistance. The various vehicle-mounted devices that are controlled may include a monitor that displays images, and audio equipment that outputs warning sounds and audio guidance. Furthermore, a control device that controls the internal combustion engine, the power train mechanism, and the brake mechanism and the like of the own vehicle VH may be included.

The axial deviation notifying device 51 is an audio output device installed in the vehicle interior that outputs warning sounds to the occupant of the own vehicle VH. The audio equipment or the like provided in the assistance executing unit 5 may be used as the axial deviation notifying device 51.

The mounting angle adjusting device 52 includes a motor, and gears attached to the radar device 2. The mounting angle adjusting device 52 rotates the motor according to a drive signal output from the signal processing unit 4. As a result, the rotational force of the motor is transmitted to the gears, and the radar device 2 can be rotated about the axis along the horizontal direction and the axis along the vertical direction.

1-2. Processing (1-1) Axial Deviation Estimation Processing

Figure 6:
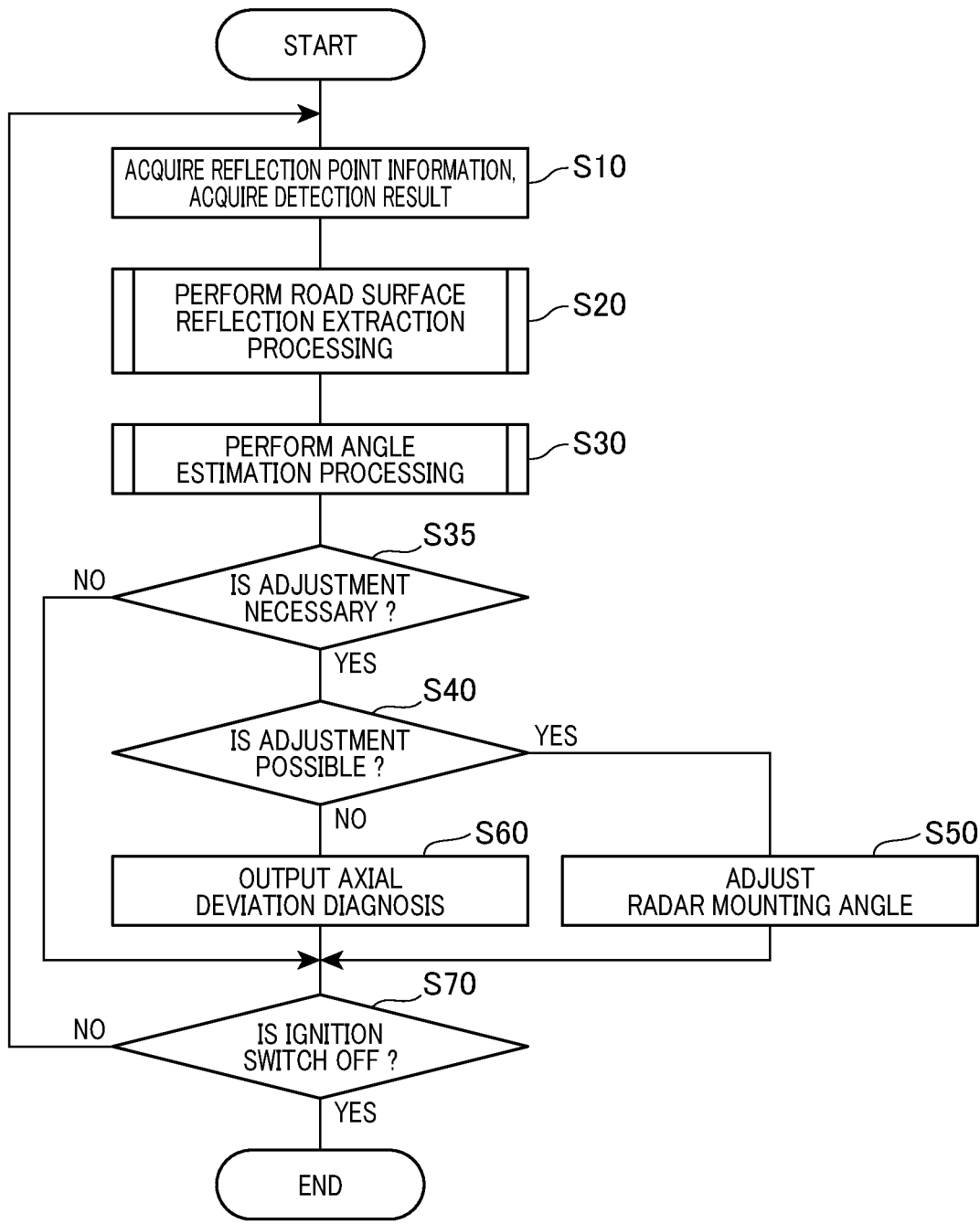
FIG. 6 is a flow chart of axial deviation estimation processing.

Next, the axial deviation estimation processing executed by the signal processing unit 4 will be described using the flowchart of FIG. 6. This processing is started when the ignition switch is turned on. In the following, an example of estimating the vertical axial deviation angle (that is, the pitch angle) αp as the axial deviation angle will be described.

When the processing starts, in S10, the signal processing unit 4 acquires reflection point information from the radar device 2. In the following, the reflection points specified from the reflection point information are referred to as acquired reflection points. Furthermore, the signal processing unit 4 acquires various detection results including the own vehicle speed Cm from the vehicle-mounted sensor group 3.

In S20, the signal processing unit 4 executes road surface reflection extraction processing. The road surface reflection extraction processing is processing for extracting road surface reflection points, which are reflection points on the road surface, from among the acquired reflection points. The road surface reflection points refer to reflection points that have been detected due to reflection by the road surface. Details of the road surface reflection extraction processing will be described later.

In S30, the signal processing unit 4 executes angle estimation processing. The angle estimation processing is processing that estimates the axial deviation angle of the radar device 2. That is, in the present embodiment, the signal processing unit 4 estimates the vertical axial deviation angle $\alpha p$. Details of the angle estimation processing will be described later.

In S35, the signal processing unit 4 determines whether the axial deviation angle estimated in S30 requires adjustment. Specifically, the signal processing unit 4 determines that the vertical axial deviation angle $\alpha p$ requires adjustment if the vertical axial deviation angle $\alpha p$ is greater than or equal to a threshold angle, which is an angle that has been determined in advance. The signal processing unit 4 shifts the processing to S70 if the vertical axial deviation angle $\alpha p$ is less than the threshold angle and does not require adjustment, and shifts the processing to S40 if the vertical axial deviation angle $\alpha p$ is greater than or equal to the threshold angle and requires adjustment.

In S40, the signal processing unit 4 determines whether the axial deviation angle estimated in S30 is within an adjustable range of the mounting angle adjusting device 52. That is, the signal processing unit 4 shifts the processing to S50 if the axial deviation angle estimated in S30 is within the adjustable range, and shifts the processing to S60 if it is not within the adjustable range. That is, if the vertical axial deviation angle $\alpha p$ is within the adjustable range, the signal processing unit 4 shifts the processing to S50.

In S50, the signal processing unit 4 causes the mounting angle adjusting device 52 to adjust the radar mounting angle by the amount of the axial deviation angle estimated in S30. That is, the signal processing unit 4 rotates the radar device 2 around the left-right axis Ys of the radar device 2 by the amount of the vertical axial deviation angle $\alpha p$ about the left-right axis Ys of the radar device 2, and adjusts the mounting angle of the radar device 2. Then, the signal processing unit 4 ends the axial deviation estimation processing.

In separate processing to the axial deviation estimation processing, the signal processing unit 4 may calculate an azimuth angle in which the azimuth angle of the reflection points acquired in S10 have been corrected by the amount of the axial deviation angle estimated in S30. Then, the signal processing unit 4 may execute the target recognition processing mentioned above based on the corrected azimuth angle.

In S60, the signal processing unit 4 outputs diagnostic information indicating that an axial deviation has occurred in the radar device 2 to a device external to the signal processing unit 4. In the following, the diagnostic information indicating that an axial deviation has occurred in the radar device 2 is referred to as an axial deviation diagnosis. The axial deviation notifying device 51 may be an external device. The signal processing unit 4 may, for example, output an axial deviation diagnosis to the axial deviation notifying device 51. The axial deviation notifying device 51 may output a warning sound according to the axial deviation diagnosis.

In S70, the signal processing unit 4 determines whether the ignition switch has been switched off. Here, if the ignition switch has not been switched off, the signal processing unit 4 shifts the processing to S10. On the other hand, if the ignition switch has been switched off, the signal processing unit 4 ends the axial deviation estimation processing.

(2-2) Road Surface Reflection Extraction Processing

Figure 7:
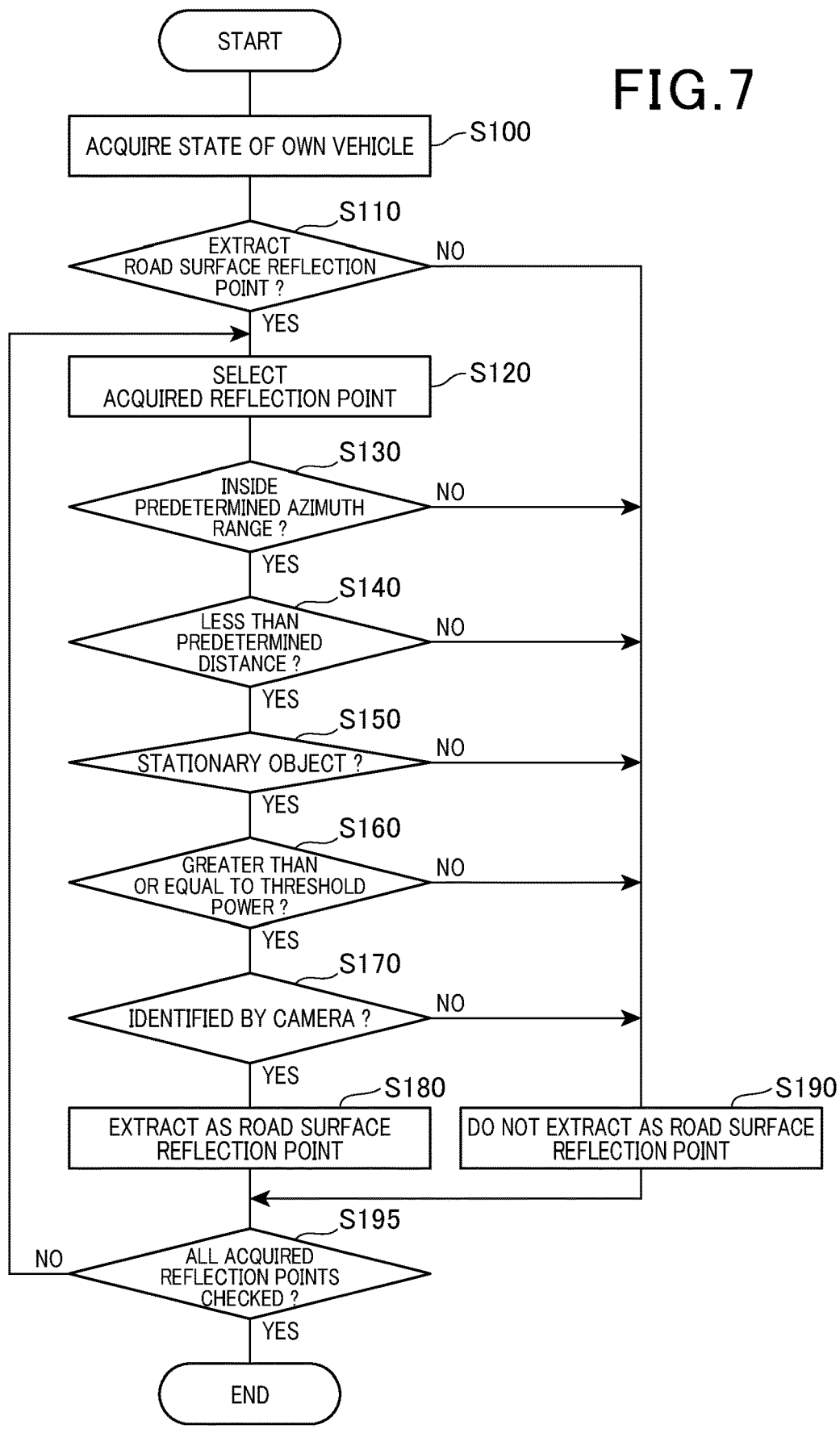
FIG. 7 is a flow chart of road surface reflection extraction processing.

Next, the road surface reflection extraction processing executed by the signal processing unit 4 in S20 of the axial deviation estimation processing will be described using the flowchart of FIG. 7.

In S100, the signal processing unit 4 acquires a detection result, such as the state of the own vehicle VH according to various sensors, from the vehicle-mounted sensor group 3. The detection result referred to here may include the vehicle speed, the acceleration, and the yaw angle and the like of the own vehicle VH.

In S110, the signal processing unit 4 determines whether to extract road surface reflection points based on the detection result, such as the state of the own vehicle VH, acquired from the vehicle-mounted sensor group 3.

Specifically, the signal processing unit 4 determines whether the vehicle body of the own vehicle VH is stable with respect to the road surface based on the detection result, such as the state of the own vehicle VH, and determines that road surface reflection points are to be extracted if the state of the vehicle body of the own vehicle VH is stable respect to the road surface.

A state in which the vehicle body of the own vehicle VH is stable with respect to the road surface is possible in a state where the vehicle body of the own vehicle VH is not tilted with respect to the road surface, and a state where the vehicle body of the own vehicle VH is not moving up or down with respect to the road surface. In other words, a state in which the vehicle body of the own vehicle VH is stable with respect to the road surface is possible when it is not traveling on a curved road having a large curvature, and not traveling on a road surface having significant unevenness.

Here, travel on a flat road surface can be assumed when travel on a road surface having significant unevenness is not taking place. In this case, the speed and acceleration are considered to be larger than when traveling on a road having significant unevenness. On the other hand, a state approaching travel on a straight road can be assumed when travel on a curved road having a large curvature is not taking place. In this case, the speed and acceleration are often larger than when traveling on a curved road having a large curvature, and the rate of change in the yaw angle is smaller than when traveling on a curved road having a large curvature.

Therefore, if the vehicle speed of the own vehicle VH is greater than or equal to a predetermined vehicle speed threshold, the signal processing unit 4 may determine that the state of the vehicle body of the own vehicle VH is stable with respect to the road surface, and determine that road surface reflection points are to be extracted. That is, if the vehicle speed of the own vehicle VH is less than the vehicle speed threshold, the signal processing unit 4 may determine that the state of the vehicle body of the own vehicle VH is not stable with respect to the road surface, and determine that road surface reflection points are not to be extracted.

Similarly, if the acceleration of the own vehicle VH is greater than or equal to a predetermined acceleration threshold, the signal processing unit 4 may determine that the state of the vehicle body of the own vehicle VH is stable with respect to the road surface, and determine that road surface reflection points are to be extracted. Likewise, if the rate of change of the yaw angle of the own vehicle VH is less than a predetermined threshold, the signal processing unit 4 may determine that the state of the vehicle body of the own vehicle VH is stable with respect to the road surface, and determine that road surface reflection points are to be extracted.

The signal processing unit 4 shifts the processing to S120 if it determines that road surface reflection points are to be extracted, and shifts the processing to S180 if it determines that road surface reflection points are not to be extracted.

In S120, the signal processing unit 4 selects one of the acquired reflection points from among all of the acquired reflection points. The signal processing unit 4 executes the processing of S130 to S195 with respect to the selected acquired reflection point (hereinafter, simply referred to as acquired reflection point).

In S130, the signal processing unit 4 determines whether the acquired reflection point is located inside an extraction range, which is a predetermined azimuth range in the horizontal direction that includes the central axis CA. The signal processing unit 4 shifts the processing to S140 if the acquired reflection point is located inside the azimuth range, and shifts the processing to S190 if the selected acquired reflection point is not located inside the azimuth range.

That is, the signal processing unit 4 extracts the acquired reflection points located inside the extraction range from among the plurality of acquired reflection points. The extraction range may be set to, for example, a range in the horizontal direction of plus or minus several degrees to several tens of degrees which includes the central axis CA. In other words, in the present embodiment, in which the radar device 2 is installed on the front of the own vehicle VH, the extraction range may be set to a predetermined range near the traveling direction of the own vehicle VH. The extraction range may be determined in advance by an experiment or the like. The extraction range is stored in advance in the memory 42.

In S140, the signal processing unit 4 determines whether the distance of the selected acquired reflection point from the radar device 2 is less than a predetermined distance threshold. The signal processing unit 4 shifts the processing to S150 if the distance of the selected acquired reflection point is less than the distance threshold, and shifts the processing to S190 if the distance of the selected acquired reflection point is greater than or equal to the distance threshold.

That is, the signal processing unit 4 extracts the acquired reflection points whose distance from the radar device 2 is less than the distance threshold. The distance threshold is stored in advance in the memory 42.

In S150, the signal processing unit 4 determines whether the acquired reflection point is a stationary reflection point. The signal processing unit 4 shifts the processing to S160 if the acquired reflection point is a stationary reflection point, and shifts the processing to S190 if the acquired reflection point is not a stationary reflection point. A stationary reflection point is a reflection point in which the radar wave is reflected by a stationary object.

That is, the signal processing unit 4 extracts the stationary reflection points from among the acquired reflection points. Specifically, the signal processing unit 4 may use the own vehicle speed Cm acquired in S10 to extract the acquired reflection points that satisfy the expression $\varepsilon_1 \leq q/Cm < \varepsilon_2$ as stationary reflection points, where q is the relative speed included in the reflection point information, $\varepsilon_1$ is a preset lower limit speed threshold, and $\varepsilon_2$ is a preset upper limit speed threshold. Therefore, an acquired reflection point in which the ratio of the own vehicle speed Cm to the relative speed q is within a preset speed threshold range of $\varepsilon_1$ or more and less than $\varepsilon_2$ may be extracted as a stationary reflection point.

If the direction from the stationary reflection point toward the radar device 2 matches the beam direction, the own vehicle speed Cm and the relative speed q of the reflection point become the same magnitude, and because the direction of relative speed q is the opposite direction to the own vehicle speed Cm, $q/Cm=-1$. In this way, a reflection point in which $q/Cm=-1$ can be considered to be a stationary reflection point.

However, the own vehicle speed Cm acquired from the vehicle-mounted sensor group 3 does not necessarily match the actual vehicle speed due to slipping of the wheels and the like. Furthermore, the relative speed q detected by the radar device 2 also includes an error. As a result, a stationary reflection point may not necessarily result in $q/Cm=-1$. The lower limit speed threshold value $\varepsilon_1$ and the upper limit speed threshold value $\varepsilon_2$ may use values appropriately set to account for such influences.

In S160, the signal processing unit 4 determines whether the reflected power from the acquired reflection point is less than a predetermined power threshold. The signal processing unit 4 shifts the processing to S170 if the reflected power from the acquired reflection point is less than the power threshold, and shifts the processing to S190 if the reflected power from the acquired reflection point is greater than or equal to the power threshold.

That is, the signal processing unit 4 extracts the acquired reflection points whose reflected power is less than the power threshold. The reflected power from the road surface, for example, is considered to be smaller than the reflected power from another vehicle. The power threshold may be appropriately determined based on the reflected power from such a road surface. For example, the power threshold may be determined in advance by an experiment or the like. The power threshold is stored in advance in the memory 42.

In S170, the signal processing unit 4 determines whether the acquired reflection point has been identified as the road surface in the image captured by the camera. The signal processing unit 4 shifts the processing to S180 if the acquired reflection point has been estimated to be the road surface in the captured image, and shifts the processing to S195 if the acquired reflection point has not been estimated to be the road surface in the captured image.

That is, the signal processing unit 4 extracts the acquired reflection points that have been identified as the road surface in the captured image. The signal processing unit 4 may be configured such that, in separate processing to the axial deviation estimation processing, it acquires the image captured by the camera and estimates the azimuth range identified as the road surface in the captured image.

In S180, the signal processing unit 4 determines that the acquired reflection point is a road surface reflection point, and stores the three-dimensional coordinates of the acquired reflection point as a road surface reflection point in the memory 42, and shifts the processing to S195.

In S190, the signal processing unit 4 determines that the acquired reflection point is not a road surface reflection point, and shifts the processing to S195 without storing it in the memory 42.

In S195, the signal processing unit 4 determines whether checking of all the acquired reflection points has been completed in terms of whether they are road surface reflection points. Here, the signal processing unit 4 shifts the processing to S110 if the checking has not been completed, and repeats the processing of S110 to S195. On the other hand, the signal processing unit 4 ends the road surface reflection extraction processing if the confirmation has been completed.

That is, in the road surface extraction processing of the present embodiment, among the acquired reflection points, the acquired reflection points that satisfy all of conditions (a) to (d) below are extracted as road surface reflection points.

(a) It is located within an extraction range in the horizontal direction that includes the central axis CA.

(b) The distance from the radar device 2 is less than the distance threshold.

(c) It is a stationary reflection point.

(d) The reflected power is less than the power threshold.

(e) It has been identified as the road surface in the image captured by the camera.

The road surface reflection extraction processing may be configured to satisfy at least condition (a) among conditions (a) to (e) above. That is, the road surface reflection extraction processing may be configured to satisfy condition (a), and further satisfy at least one of conditions (b) to (e). Alternatively, the road surface reflection extraction processing may be configured to satisfy conditions (a) and (b). That is, the road surface reflection extraction processing may be configured to satisfy conditions (a) and (b), and the road surface reflection extraction processing may further satisfy at least one of conditions (c) to (e).

2-3. Angle Estimation Processing

Next, the angle estimation processing executed by the signal processing unit 4 in S30 of the axial deviation estimation processing will be described using the flowchart of FIG. 8.

In S210, the signal processing unit 4 calculates device-system coordinates for the road surface reflection point based on the reflection point information by using the distance and the azimuth angle included in the reflection point information. The device-system coordinates are three-dimensional coordinates based on the coordinate axes of the radar device 2. The device-system coordinates are coordinates having as elements a horizontal distance (ys) and a vertical distance (zs) on a plane perpendicular to the beam direction, and a distance (xs) in the beam direction. The signal processing unit 4 calculates device-system coordinates (xs, ys, zs) for all the road surface reflection points, and stores the coordinates in the memory 42.

In S220, the signal processing unit 4 uses a relational expression that holds between two unknown parameters including the axial deviation angle, and two elements included in the device-system coordinates, to estimate the axial deviation angle included in the unknown parameters.

The axial deviation angle represents the axial deviation angle of the coordinate axes of the radar device 2 about a target axis, which is one of the horizontal axis Yc and the traveling direction axis Xc, which are coordinate axes of the own vehicle VH. As mentioned above, in the present embodiment, the method of estimating the vertical axial deviation angle $\alpha p$, which is the axial deviation angle of the coordinate axes of the radar device 2, about the horizontal axis Yc will be described, where the horizontal axis Yc is a coordinate axis of the own vehicle VH and represents the target axis.

The coordinate axis of the radar device 2 that corresponds to the target axis is referred to as the corresponding axis. The two elements included in the device-system coordinates mentioned above are elements related to the two coordinate axes of the radar device 2 included in a plane perpendicular to the corresponding axis among the three coordinate axes of the radar device 2. In other words, the two elements included in the device-system coordinates mentioned above correspond to the coordinates of a projection point obtained by projecting a road surface reflection point onto a projection surface, which is a plane perpendicular to the corresponding axis among the three coordinate axes of the radar device 2.

In the present embodiment, which estimates the vertical axial deviation angle $\alpha p$, the coordinate axis among the three coordinate axes of the radar device 2 that corresponds to the horizontal axis Yc, which is the target axis, is the left-right axis Ys. That is, the elements related to the up-down axis Zs and the front-rear axis Xs of the radar device 2 (that is, zs and xs) included in the plane perpendicular to the left-right axis Ys, which is the corresponding axis among the three coordinate axes of the radar device 2, correspond to the two elements included in the device-system coordinates mentioned above. In other words, the two elements zs and xs included in the device-system coordinates correspond to the coordinates of a projection point obtained by projecting a road surface reflection point onto a projection surface plane perpendicular to the left-right axis Ys.

Figure 9:
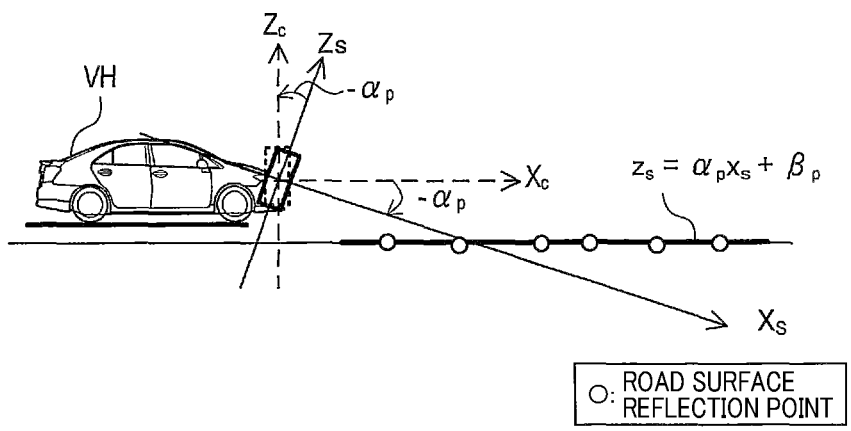
FIG. 9 is an explanatory diagram illustrating the principle on which a vertical axial deviation angle is estimated in the first embodiment.

As shown in FIG. 9, the road surface reflection points are located on the road surface. In other words, the road surface reflection points are located on the same plane, which is referred to as the road surface. From this, the plurality of road surface reflection points can be considered to be linearly arranged on a projection surface. That is, the following equation (1) holds.

[Math. 1]

$$z_s = \alpha_p x_s + \beta_p \tag{1}$$

Equation (1) is a linear equation representing a straight line on a projection surface formed by the front-rear axis Xs and the up-down axis Zs. $\alpha p$ indicates the slope of the straight line, and therefore, the vertical axial deviation angle $\alpha p$. $\beta p$ indicates the intercept on the up-down axis Zs (and is therefore the Z intercept). The two unknown values are $\alpha p$ and $\beta p$. Because there are two unknowns, the vertical axial deviation angle $\alpha p$ is estimated based on at least two road surface reflection points. The unknown vertical axial deviation angle $\alpha p$ may be estimated by using the least squares method or the like based on a plurality of road surface reflection points.

The signal processing unit 4 stores the estimated vertical axial deviation angle $\alpha p$ in the memory 42, and ends the angle estimation processing.

1-3. Effects

According to the first embodiment described in detail above, the following effects are obtained.

(1a) In S10, the signal processing unit 4 repeatedly acquires reflection point information for each of the plurality of reflection points detected by the radar device 2. The reflection point information includes at least a horizontal angle and a vertical angle, which are azimuth angles of the reflection point that have been obtained with reference to the beam direction, and a distance between the radar device 2 and the reflection point. In S20, the signal processing unit 4 extracts, based on at least the reflection point information, at least one road surface reflection point from among the plurality of reflection points.

In S210, the signal processing unit 4 specifies the device-system coordinates for each road surface reflection point based on the reflection point information. In S220, the signal processing unit 4 uses a relational expression (that is, equation (1)) that holds between two unknown parameters (that is, $\alpha p$ and $\beta p$) including at least the axial deviation angle (that is, the vertical axial deviation angle $\alpha p$), and two elements (that is, xs and zs) included in the device-system coordinates of the road surface reflection point, to estimate the vertical axial deviation angle $\alpha p$. The vertical axial deviation angle $\alpha p$ represents the axial deviation angle of the coordinate axes of the radar device 2 about a target axis (that is, the horizontal axis Yc), which is one of the horizontal axis Yc and the traveling direction axis Xc, which are coordinate axes of the own vehicle VH.

Here, the device-system coordinates of each of the reflection points are accurately detected by the radar device 2. The signal processing unit 4 arithmetically estimates the vertical axial deviation angle $\alpha p$ as the axial deviation angle based on the device-system coordinates of the road surface reflection point.

As a result, because the signal processing unit 4 arithmetically estimates the axial deviation angle, it is possible to suppress the estimation error of the axial deviation angle compared to the conventional device, which estimates the axial deviation angle based on the fact that the reception intensity of the reflected wave from near the vehicle reaches a maximum when an axial deviation angle occurs. This is because, in the conventional device, the estimation accuracy of the axial deviation angle may decrease when, for example, a manhole or the like with a high reflection intensity exists in the distance.

(1b) The two elements included in the device-system coordinates mentioned above (that is, xs and zs) are elements related to two coordinate axes (that is, the front-rear axis Xs and the up-down axis Zs) of the radar device 2 included in a plane perpendicular to the corresponding axis (that is, the left-right axis Ys) among the three coordinate axes of the radar device 2. The corresponding axis is the coordinate axis of the radar device 2 that corresponds to the target axis (that is, Yc). As a result, because the axial deviation angle is estimated based on two-dimensional coordinates, it is possible to reduce the processing load of the signal processing unit 4 compared to a case where device-system coordinates, which are three-dimensional coordinates, are used.

(1c) In S110, the signal processing unit 4 may acquire the detection result of the state of the own vehicle VH from the vehicle-mounted sensor group 3, which detects the state of the own vehicle VH, and determines based on the detection result whether the vehicle body of the own vehicle VH is stable with respect to the road surface. Further, if it is determined that the vehicle body of the own vehicle VH is stable with respect to the road surface, the signal processing unit 4 may extract in S20 at least one road surface reflection point from among the plurality of reflection points. This makes it difficult for a reflection point on a non-planar road surface, such as a sloped surface or an uneven surface, to be extracted as a road surface reflection point. Therefore, because reflection points on a flat road surface are more easily extracted as road surface reflection points, it is possible to estimate the axial deviation angle more accurately based on the road surface reflection points being located on the same plane.

(1d) In S130, based on the reflection point information, the signal processing unit 4 may extract from among the plurality of reflection points at least one reflection point located inside the predetermined azimuth range, which includes the central axis CA of the radar beam in the horizontal direction, as a road surface reflection point.

As a result, because the road surface is considered to at least be located near the front of the own vehicle VH in the traveling direction (that is, the direction of the central axis CA of the radar beam), the accuracy of extracting the acquired reflection points on the road surface can be improved by appropriately determining the predetermined azimuth range.

(1e) In S140, based on the reflection point information, the signal processing unit 4 may extract from the plurality of reflection points at least one reflection point whose distance from the radar device 2 is less than the distance threshold as a road surface reflection point. As a result, because the road surface is considered to at least be located in the immediate vicinity of the own vehicle VH, the accuracy of extracting the acquired reflection points on the road surface can be further improved by appropriately determining the distance threshold.

(1f) The reflection point information may include the relative speeds of the reflection points with respect to own vehicle VH. In S150, based on the reflection point information, the signal processing unit 4 may extract from the plurality of reflection points at least one reflection point that is a stationary reflection point as a road surface reflection point. As a result, because the road surface is stationary with respect to the own vehicle VH, the accuracy of extracting the reflection points on the road surface can be further improved.

(1g) The reflection point information may include the reception intensities of the reflection points. In S160, based on the reflection point information, the signal processing unit 4 may extract at least one reflection point whose reflected power is less than the power threshold as a road surface reflection point. As a result, because the reflected power from the road surface is considered to be smaller than, for example, the reflected power from another vehicle, by appropriately determining the power threshold based on the reflected power from the road surface, it is possible to further improve the accuracy of extracting the reflection point on the road surface.

(1h) The signal processing unit 4 may be configured to acquire an image captured by the camera, and estimate the azimuth range identified as the road surface in the captured image. In S170, the signal processing unit 4 may extract from the plurality of reflection points at least one reflection point in the azimuth range estimated as being the road surface in the captured image as a road surface reflection point. As a result, the accuracy of extracting the road surface reflection points can be further improved.

In the embodiment described above, the own vehicle VH corresponds to the mobile body, and the signal processing unit 4 corresponds to the axial deviation estimating device.

Furthermore, the coordinate axes of the own vehicle VH correspond to the coordinate axes of the mobile body. Moreover, the vertical axial deviation angle $\alpha p$ corresponds to the axial deviation angle. $\alpha p$ and $\beta p$ correspond to the two unknown parameters including the axial deviation angle. In other words, $\alpha p$ and $\beta p$ correspond to the at least one unknown parameter including the axial deviation angle. xs and zs correspond to the two elements included in the device-system coordinates. The horizontal axis Yc corresponds to the target axis, the left-right axis Ys corresponds to the corresponding axis, and the two coordinate axes of the radar device 2 included in a plane perpendicular to the corresponding axis correspond to the front-rear axis Xs and the up-down axis Zs.

Figure 10:
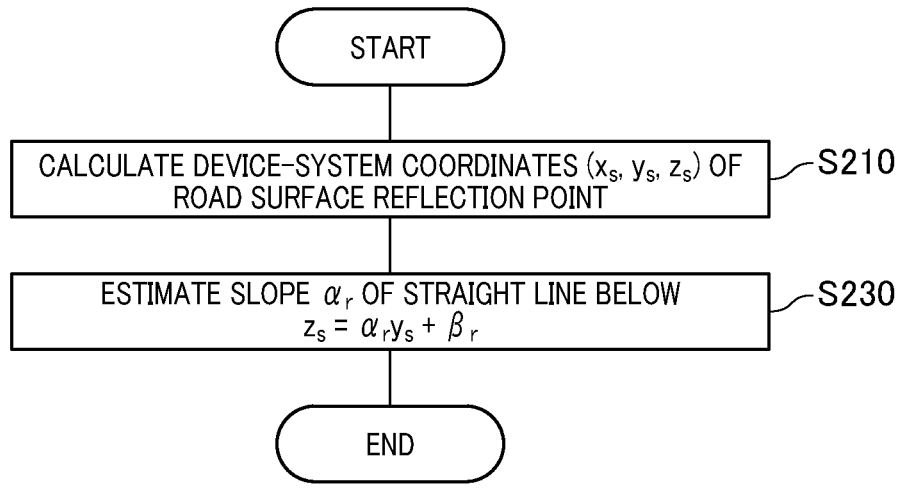
FIG. 10 is a flowchart of angle estimation processing in a first modification.

1-4. Modifications (Modification 1) The signal processing unit 4 may estimate the roll angle αr as the axial deviation angle instead of the vertical axial deviation angle αp. In Modification 1, the signal processing unit 4 may execute the angle estimation processing shown in FIG. 10 instead of the angle estimation processing shown in FIG. 8. In the angle estimation processing shown in FIG. 10, S220 in FIG. 8 is replaced with S230.

Figure 8:
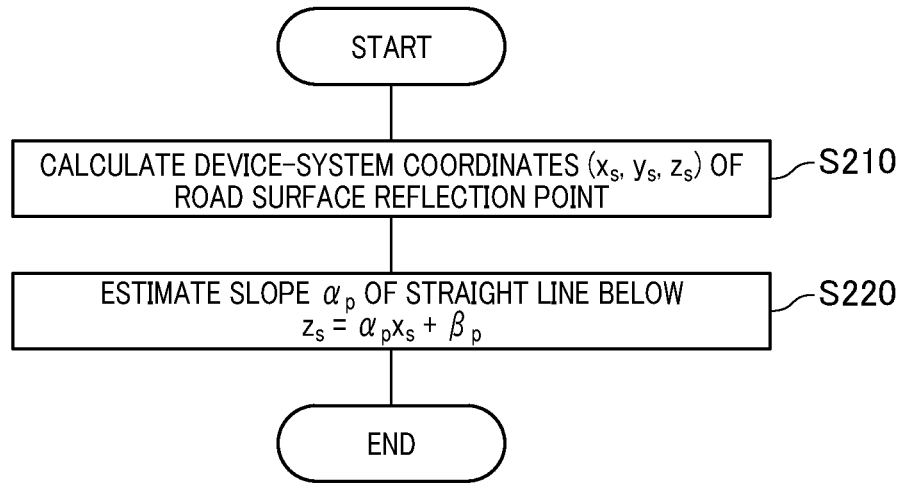
FIG. 8 is a flowchart of angle estimation processing in a first embodiment.

In S210, the signal processing unit 4 specifies the device-system coordinates for each road surface reflection point based on the reflection point information in the same manner as in S210 shown in FIG. 8.

In S230, the signal processing unit 4 may use a relational expression (that is, equation (2) described below) that holds between two unknown parameters (that is, αr and βr) including at least the axial deviation angle (that is, the roll angle αr), and two elements (that is, ys and zs) included in the device-system coordinates of the road surface reflection point to estimate the roll angle αr.

The roll angle αr represents the axial deviation angle of the coordinate axes of the radar device 2 about a target axis (that is, the traveling direction axis Xc), which is one of the horizontal axis Yc and the traveling direction axis Xc, which are coordinate axes of the own vehicle VH.

The two elements included in the device-system coordinates are elements related to two coordinate axes (that is, the left-right axis Ys and the up-down axis Zs) of the radar device 2 included in a plane perpendicular to a corresponding axis (that is, the front-rear axis Xs) that corresponds to the target axis (that is, the traveling direction axis Xc) among the three coordinate axes of the radar device 2. In other words, the two elements ys and zs included in the device-system coordinates correspond to the coordinates of a projection point obtained by projecting the road surface reflection point onto a projection surface perpendicular to the front-rear axis Xs, which is the corresponding axis.

Figure 11:
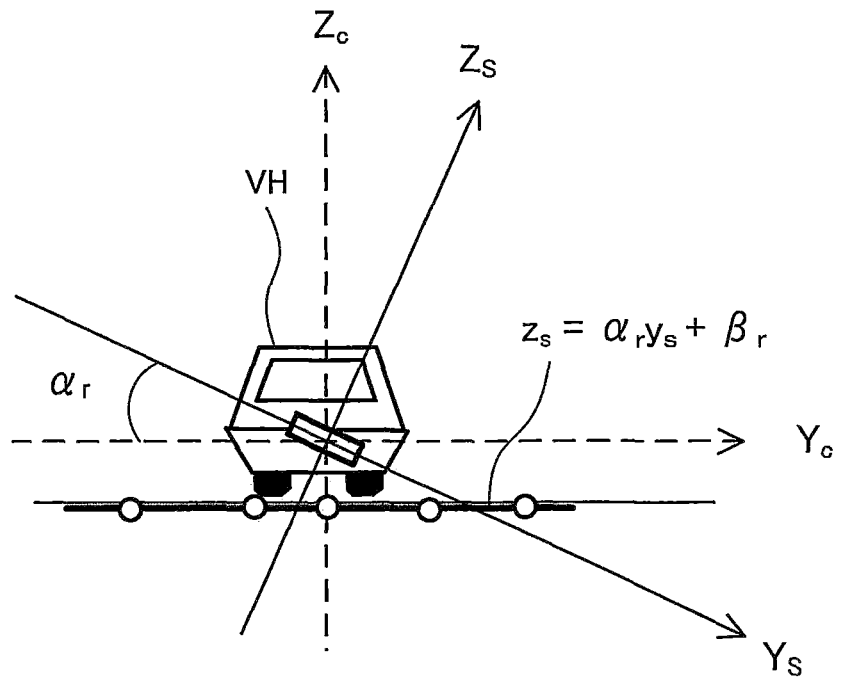
FIG. 11 is an explanatory diagram illustrating the principle on which a roll angle is estimated in the first modification.

As shown in FIG. 11, the road surface reflection points are located on the same plane, which is referred to as the road surface. From this, the plurality of road surface reflection points can be considered to be linearly arranged on a projection surface. That is, the following equation (2) holds.

[Math. 2]

$$z_s = \alpha_r y_s + \beta_r \tag{2}$$

Equation (2) is a linear equation representing a straight line on a projection surface formed by the left-right axis Ys and the up-down axis Zs. αr indicates the slope of the straight line, and therefore, the roll angle αr. βr indicates the intercept on the up-down axis Zs (and is therefore the Z intercept). The two unknown values are αr and βr.

The signal processing unit 4 stores the estimated roll angle αr in the memory 42, and ends the angle estimation processing.

In Modification 1, the roll angle αr corresponds to the axial deviation angle. αr and βr correspond to the two unknown parameters including at least the axial deviation angle. In other words, αr and βr correspond to the at least one unknown parameter including the axial deviation angle. ys and zs correspond to the two elements included in the device-system coordinates. The traveling direction axis Xc corresponds to the target axis, the front-rear axis Xs corresponds to the corresponding axis, and the two coordinate axes of the radar device 2 included in a plane perpendicular to the corresponding axis correspond to the left-right axis Ys and the up-down axis Zs.

2. Second Embodiment

2-1. Configuration

Since the basic configuration of the second embodiment is the same as that of the first embodiment, only the differences will be described below. Note that the same reference signs as those in the first embodiment indicate the same configuration, and refer to the preceding description. In the second embodiment, the signal processing unit 4 differs from the first embodiment in that the axial deviation angle is the only unknown parameter, and the axial deviation angle, which is the unknown parameter, is estimated. In the following, an example of estimating the vertical axial deviation angle (that is, the pitch angle) αp as the axial deviation angle will be described.

2-2. Processing

Figure 12:
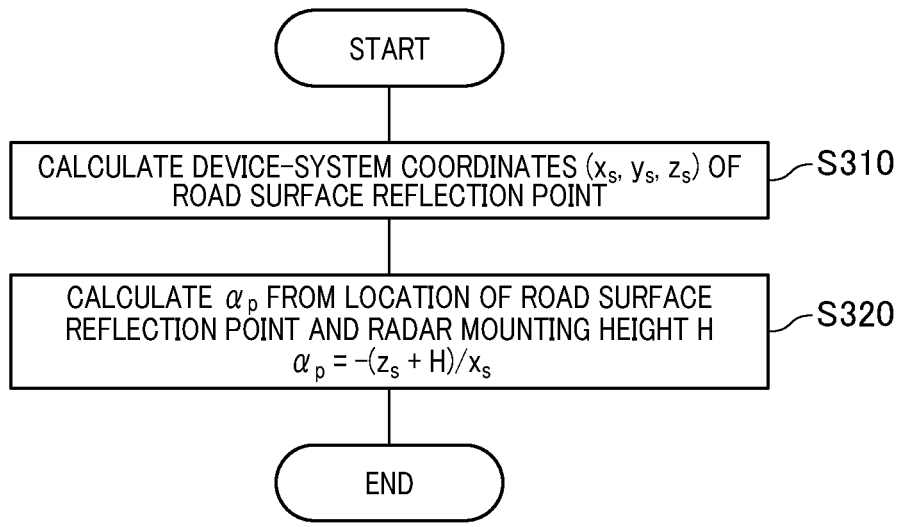
FIG. 12 is a flowchart of angle estimation processing in a second embodiment.

The signal processing unit 4 executes the angle estimation processing of the second embodiment shown in FIG. 12 instead of the angle estimation processing of the first embodiment shown in FIG. 8.

In S310, the signal processing unit 4 calculates device-system coordinates (xs, ys, zs) for all the road surface reflection points and stores the coordinates in the memory 42 in the same manner as the processing of S210 of the angle estimation processing of the first embodiment.

In S320, the signal processing unit 4 estimates the axial deviation angle using a relational expression (that is, equation (3)) that holds between the vertical axial deviation angle αp, which is the unknown parameter, the mounting height H of the radar device 2, and two elements (that is, xs and zs) included in the device-system coordinates. The mounting height H is the height of the radar device 2 of the own vehicle VH from the road surface, and is stored in advance in the memory 42.

[Math. 3]

$$\alpha_p = -\frac{z_s + H}{x_s} \tag{3}$$

Figure 13:
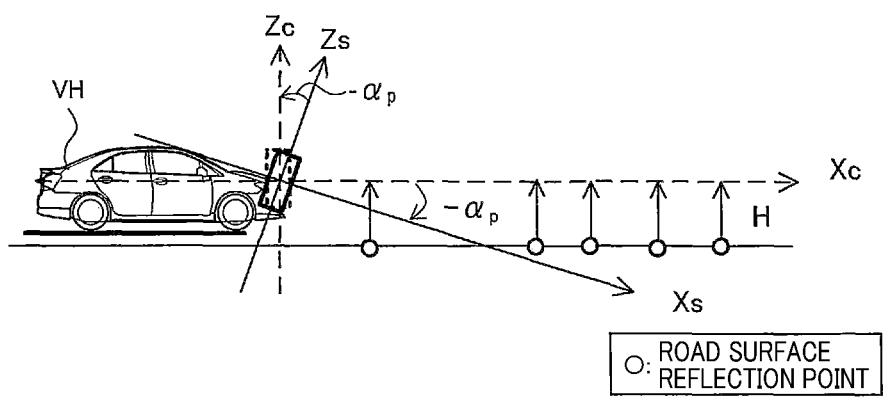
FIG. 13 is an explanatory diagram illustrating the principle on which a vertical axial deviation angle is estimated in the second embodiment.

As shown in FIG. 13, equation (3) is obtained based on a rotation of the front-rear axis Xs and the up-down axis Zs, which are coordinate axes of the radar device 2, by the amount of the vertical axial deviation angle αp on the projection surface, and then matching the axes with the traveling direction axis Xc and the vertical axis Zc, which are coordinate axes of the own vehicle VH.

That is, as shown in equation, by displacing the coordinate axes of the radar device 2 about the traveling direction axis Xc by the amount of the vertical axial deviation angle αp on the projection surface, the two elements (xs and zs) of the device-system coordinates match the two elements (xc and zc) of the vehicle-system coordinates. The vehicle-system coordinates are three-dimensional coordinates (xc, yc, and zc) based on the coordinate axes of the own vehicle VH. In other words, by rotating the radar device 2 about the front-rear axis Xs by the amount of the vertical axial deviation angle αp on the projection surface, the two elements (xs and zs) of the device-system coordinate match the two elements (xc and zc) of the vehicle-system coordinates.

[Math. 4]

$$\begin{bmatrix} X_c \\ Z_c \end{bmatrix} = \begin{bmatrix} \cos\alpha_p & -\sin\alpha_p \\ \sin\alpha_p & \cos\alpha_p \end{bmatrix} \begin{bmatrix} X_s \\ Z_s \end{bmatrix} \quad (4)$$

$$\approx \begin{bmatrix} 1 & -\alpha_P \\ \alpha_P & 1 \end{bmatrix} \begin{bmatrix} X_s \\ Z_s \end{bmatrix} \quad (5)$$

$$\approx \begin{bmatrix} X_s - \alpha_{P Z_s} \\ \alpha_{P X_s} + Z_s \end{bmatrix} \quad (6)$$

$$[Z_c] = [Z_s + \alpha_{P X_S}] = [-H] \quad (7)$$

Here, assuming that the vertical axial deviation angle αp is sufficiently small, the approximate expressions shown in equation (5) and equation (6) can be obtained from equation. Furthermore, as shown in FIG. 13, because the road surface reflection points are located on the same plane, which is referred to as the road surface, it is clear that the magnitude of the element zc in the vertical axis Zc of the vehicle coordinates (xc, yc, and zc) is equal to the mounting height H of the radar device 2, and the sign is negative. As a result, equation (7) is obtained. Equation (3) above is obtained based on equation (7).

The signal processing unit 4 calculates the vertical axial deviation angle αp based on equation (3), stores the calculated vertical axial deviation angle αp in the memory 42, and ends the angle estimation processing.

2-3. Effects

According to the second embodiment described in detail above, the following effects are obtained.

(2a) In S320, the signal processing unit 4 estimates the vertical axial deviation angle αp using a relational expression (that is, equation (3)). This relational expression is a relational expression that holds between one unknown parameter (that is, the vertical axial deviation angle αp), the mounting height H of the radar device 2, and two elements (that is, xs and zs) included in the device-system coordinates of the road surface reflection point. The vertical axial deviation angle αp represents the axial deviation angle of the coordinate axes of the radar device 2 about a target axis (that is, the horizontal axis Yc), which is one of the horizontal axis Yc and the traveling direction axis Xc, which are coordinate axes of the own vehicle VH.

As a result, the signal processing unit 4 is possible to obtain the same effect as (1a) described above. In addition, the signal processing unit 4 is possible to estimate the vertical axial deviation angle αp based on at least one road surface reflection point.

(2b) The mounting height H may be stored in advance in the memory 42, which is mounted on the own vehicle VH. The signal processing unit 4 may estimate the axial deviation angle based on the mounting height H stored in advance in the memory 42. As a result, it is not necessary to provide the own vehicle VH with a new configuration for detecting the mounting height H of the radar device 2.

In the embodiment described above, the vertical axial deviation angle αp corresponds to the axial deviation angle. αp corresponds to the one unknown parameter, which is the axial deviation angle. In other words, αp corresponds to the at least one unknown parameter including the axial deviation angle. xs and zs correspond to the two elements included in the device-system coordinates. The horizontal axis Yc corresponds to the target axis, the left-right axis Ys corresponds to the corresponding axis, and the two coordinate axes of the radar device 2 included in a plane perpendicular to the corresponding axis correspond to the front-rear axis Xs and the up-down axis Zs.

Figure 14:
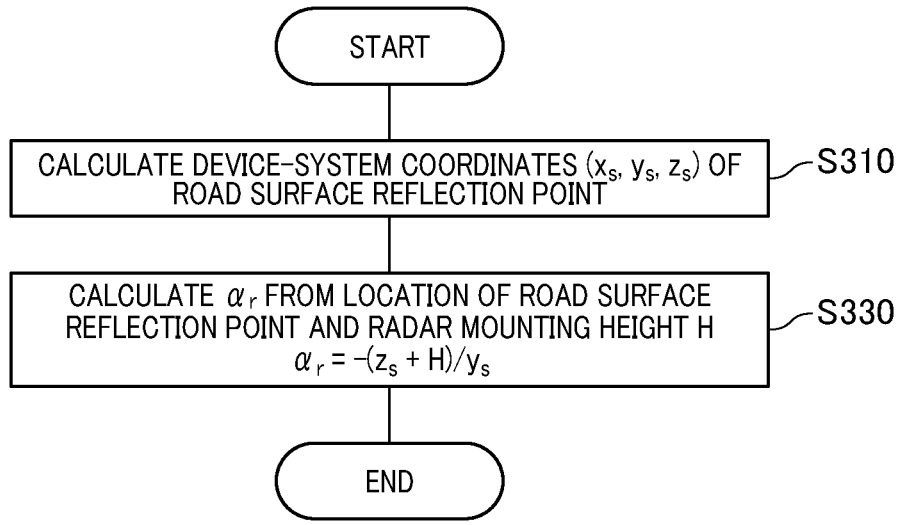
FIG. 14 is a flowchart of angle estimation processing in a second modification.

2-4. Modification (Modification 2) The signal processing unit 4 may estimate the roll angle αr as the axial deviation angle instead of the vertical axial deviation angle αp. In Modification 2, the signal processing unit 4 may execute the angle estimation processing shown in FIG. 14 instead of the angle estimation processing shown in FIG. 12. In the angle estimation processing shown in FIG. 14, S320 in FIG. 12 is replaced with S330.

In S310, the signal processing unit 4 specifies the device-system coordinates for each road surface reflection point based on the reflection point information in the same manner as in S310 shown in FIG. 12.

In S330, the signal processing unit 4 may estimate the roll angle αr using a relational expression (that is, equation (8)).

[Math. 5]

$$\alpha_r = -\frac{z_s + H}{y_s} \quad (8)$$

Equation (8) is a relational expression that holds between one unknown parameter (that is, the roll angle αr), the mounting height H of the radar device 2, and two elements (that is, ys and zs) included in the device-system coordinates of the road surface reflection point. The roll angle αr represents the axial deviation angle of the coordinate axes of the radar device 2 about a target axis (that is, the traveling direction axis Xc), which is one of the horizontal axis Yc and the traveling direction axis Xc, which are coordinate axes of the own vehicle VH.

Figure 15:
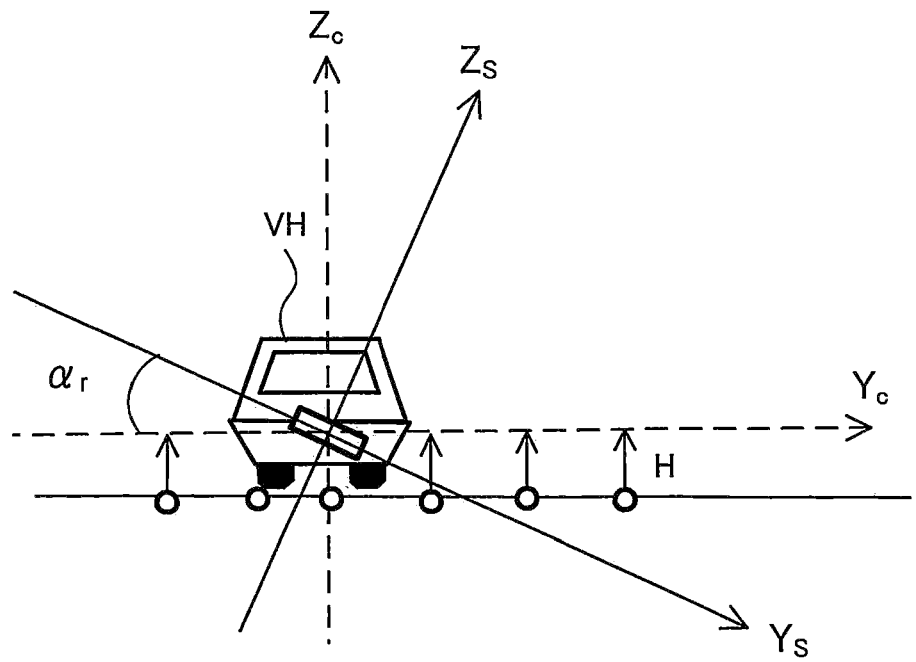
FIG. 15 is an explanatory diagram illustrating the principle on which a roll angle is estimated in the second modification.

As shown in FIG. 15, equation (8) is obtained based on a rotation of the left-right axis Ys and the up-down axis Zs, which are coordinate axes of the radar device 2, by the amount of the roll angle αr on the projection surface, and then matching the axes with the horizontal axis Yc and the vertical axis Zc, which are coordinate axes of the own vehicle VH. That is, equation (12) is obtained from equation (9) to equation (11), and equation (8) mentioned above is obtained based on equation (12).

[Math. 6]

$$\begin{bmatrix} y_c \\ z_c \end{bmatrix} = \begin{bmatrix} \cos\alpha_r & -\sin\alpha_r \\ \sin\alpha_r & \cos\alpha_r \end{bmatrix} \begin{bmatrix} y_s \\ z_s \end{bmatrix} \quad (9)$$

$$\approx \begin{bmatrix} 1 & -\alpha_r \\ \alpha_r & 1 \end{bmatrix} \begin{bmatrix} y_s \\ z_s \end{bmatrix} \quad (10)$$

-continued $$\approx \begin{bmatrix} y_s - \alpha_r z_s \\ \alpha_r y_s + z_s \end{bmatrix} \quad (11)$$

$$[z_c] = [z_s + \alpha_r y_s] = [-H] \quad (12)$$

The signal processing unit 4 calculates the roll angle αr based on equation (8) mentioned above, stores the calculated roll angle αr in the memory 42, and ends the angle estimation processing.

In the embodiment described above, the roll angle αr corresponds to the axial deviation angle. αr corresponds to the one unknown parameter, which is the axial deviation angle. In other words, αr corresponds to the at least one unknown parameter including the axial deviation angle. ys and zs correspond to the two elements included in the device-system coordinates. The traveling direction axis Xc corresponds to the target axis, the front-rear axis Xs corresponds to the corresponding axis, and the two coordinate axes of the radar device 2 included in a plane perpendicular to the corresponding axis correspond to the left-right axis Ys and the up-down axis Zs.

(Modification 3) The vehicle-mounted sensor group 3 may be provided with a sensor that detects the location of the radar device 2. This sensor may be, for example, a camera or various radar devices. In the angle estimation processing, the signal processing unit 4 may estimate the axial deviation angle based on a mounting height H detected by this sensor.

As a result, even if a deviation of the radar device 2 occurs in the upward or downward direction in the vertical axis Zc after the mounting height H is stored in the memory 42, it is possible to accurately estimate the axial deviation angle based on the mounting height H detected by the sensor.

Figure 16:
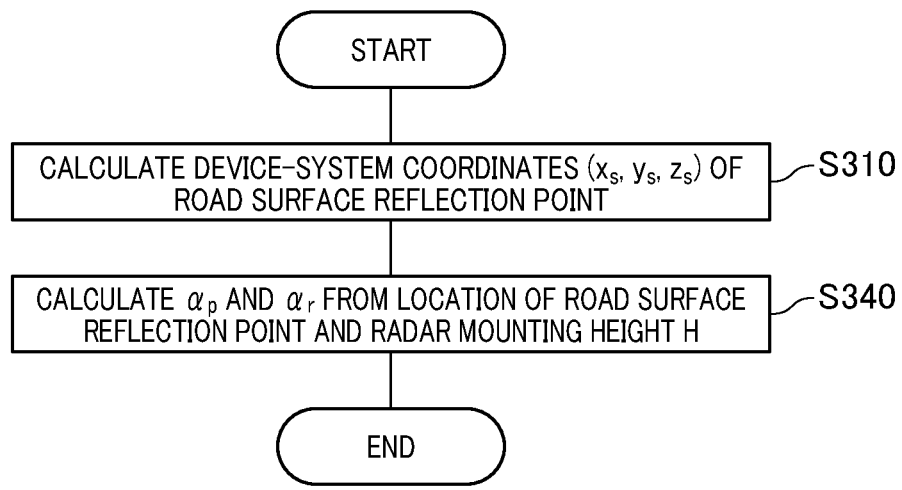
FIG. 16 is a flowchart of angle estimation processing in a fourth modification.

(Modification 4) The signal processing unit 4 may estimate both the vertical axial deviation angle αp and the roll angle αr as the axial deviation angle. In Modification 4, the signal processing unit 4 may execute the angle estimation processing shown in FIG. 16 instead of the angle estimation processing shown in FIG. 12. In the angle estimation processing shown in FIG. 16, S320 in FIG. 12 is replaced with S340.

In S340, the signal processing unit 4 may estimate the vertical axial deviation angle αp and the roll angle αr using a relational expression (that is, equation (19) described below).

Figure 17:
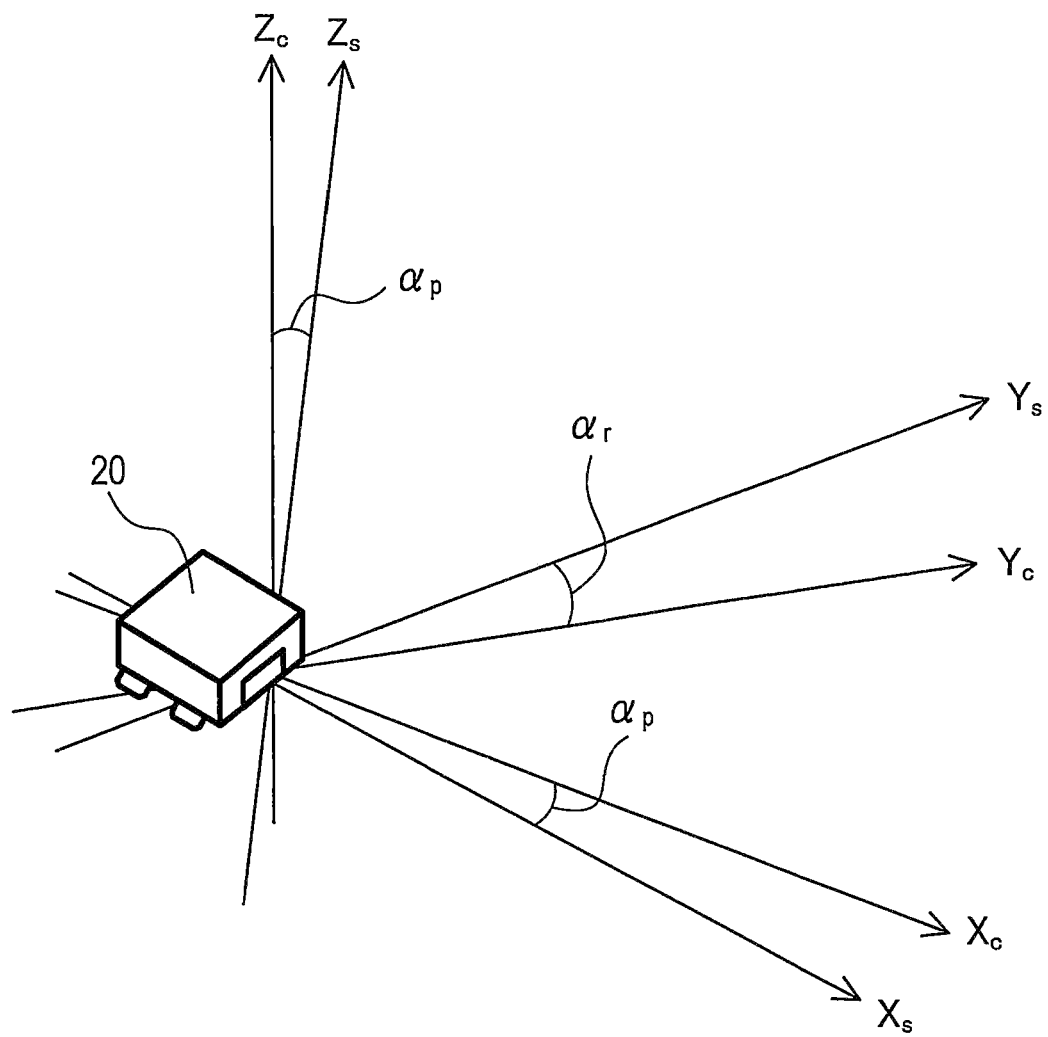
FIG. 17 is an explanatory diagram illustrating the principle on which a vertical axial deviation angle and a roll angle are estimated in the fourth modification.

As shown in FIG. 17, equation (19) is obtained based on a rotation of the coordinate axes of the radar device 2 about the left-right axis Ys by the amount of the vertical axial deviation angle αp and about the front-rear axis Xs by the amount of the roll angle αr to match the coordinate axes of the own vehicle VH. That is, equation (13) to equation (15) are obtained.

[Math. 7]

$$\begin{bmatrix} X_c \\ Y_c \\ Z_c \end{bmatrix} = \begin{bmatrix} 1 & 0 & 0 \\ 0 & \cos(-\alpha_r) & -\sin(-\alpha_r) \\ 0 & \sin(-\alpha_r) & \cos(-\alpha_r) \end{bmatrix} \begin{bmatrix} \cos(-\alpha_P) & 0 & \sin(-\alpha_P) \\ 0 & 1 & 0 \\ -\sin(-\alpha_P) & 0 & \cos(-\alpha_P) \end{bmatrix} \begin{bmatrix} X_s \\ Y_s \\ Z_s \end{bmatrix} \quad (13)$$

$$\approx \begin{bmatrix} \cos\alpha_P & 0 & -\sin(\alpha_P) \\ \sin\alpha_r \sin\alpha_P & \cos\alpha_r & \sin\alpha_r \cos\alpha_P \\ \cos\alpha_r \sin\alpha_P & -\sin\alpha_r & \cos\alpha_r \cos\alpha_P \end{bmatrix} \begin{bmatrix} X_s \\ Y_s \\ Z_s \end{bmatrix} \quad (14)$$

$$\approx \begin{bmatrix} 1 & 0 & -\alpha_P \\ 0 & 1 & \alpha_r \\ \alpha_P & -\alpha_r & 1 \end{bmatrix} \begin{bmatrix} X_s \\ Y_s \\ Z_s \end{bmatrix} \quad (15)$$

Then, equation (16) to equation (18) are obtained based on equation (15).

[Math. 8]

$$[Z_c] = [-H] \quad (16)$$

$$[Z_c] = [\alpha_P X_s - \alpha_r Y_s + Z_s] = [-H] \quad (17)$$

$$[X_s \quad -Y_x] \begin{bmatrix} \alpha_P \\ \alpha_r \end{bmatrix} = -[-Z_s - H] \quad (18)$$

Further, equation (19) above is obtained based on equation (18).

[Math. 9]

$$\begin{bmatrix} \alpha_P \\ \alpha_r \end{bmatrix} = (A^T A)^{-1} A^T B \quad (19)$$

However, $A = [X_s \quad -Y_s]$ (20)

$B = [-Z_s \quad -H]$ (21)

Equation (19) is a relational expression that holds between two unknown parameters (that is, the vertical axial deviation angle αp and the roll angle αr), the mounting height H of the radar device 2, and three elements (that is, xs, ys and zs) included in the device-system coordinates of the road surface reflection point.

The signal processing unit 4 calculates the vertical axial deviation angle αp and the roll angle αr based on equation (19) mentioned above, stores the calculated vertical axial deviation angle αp and roll angle αr in the memory 42, and ends the angle estimation processing.

3. Other Embodiments

Although the embodiments of the present disclosure have been described above, the present disclosure is not limited to the above embodiments, and can be implemented with various modifications.

(3a) In the above embodiment, although an example has been described in which the radar device 2 transmits radar waves toward the front of the own vehicle VH, the transmission direction of the radar waves is not limited to being the front of the own vehicle VH. For example, the radar device 2 may be configured to transmit radar waves toward at least one of the front, right front, left front, rear, right rear, left rear, right, and left of the own vehicle VH.

(3b) In the above embodiment, although an example has been described in which the radar device 2 adopts the FMCW method, the radar method of the radar device 2 is not limited to FMCW, and it may be configured to adopt, for example, dual frequency CW, FCM, or a pulse method. FCM is an abbreviation for Fast-Chirp Modulation.

(3c) In the above embodiment, although an example has been described in which the signal processing unit 4 executes the axial deviation estimation processing, the radar device 2 may be configured to execute the axial deviation estimation processing.

(3d) The signal processing unit 4 and method thereof described in the present disclosure may be realized by a dedicated computer which is provided by configuring a processor and memory that are programmed to execute one or more functions embodied by a computer program. Alternatively, the signal processing unit 4 and method thereof described in the present disclosure may be realized by a dedicated computer which is provided by configuring a processor with one or more dedicated hardware logic circuits. Also, the signal processing unit 4 and method thereof described in the present disclosure may be realized by one or more dedicated computers which are configured by a combination of a processor and memory that are programmed to execute one or more functions, and a processor configured by one or more hardware logic circuits. Furthermore, the computer program may be stored in a computer-readable, non-transitory tangible recording medium as instructions executed by the computer. The method for realizing the functions of each unit included in the signal processing unit 4 does not necessarily include software, and all of the functions may be realized by using one or more pieces of hardware.

(3e) A plurality of functions included in one component in the above embodiments may be realized by a plurality of components, and one function included in one component may be realized by a plurality of components. Furthermore, a plurality of functions included in a plurality of components may be realized by one component, and one function realized by a plurality of components may be realized by one component. Moreover, a portion of the configurations of the embodiments described above may be omitted. In addition, a portion of the configuration of an embodiment described above may be added or replaced with the configurations of another embodiment described above.

(3f) In addition to the signal processing unit 4, the radar device 2, and the vehicle control system 1 described above, the present disclosure can also be realized in various forms, such as a program that causes the signal processing unit 4 to function, a non-transitory tangible recording medium such as a semiconductor memory that records such a program, and an axial deviation estimation method.

In the embodiment described above, the own vehicle VH corresponds to the mobile body, the signal processing unit 4 corresponds to the axial deviation estimating device, and the memory 42 corresponds to the storage device. Furthermore, S10 corresponds to the processing as the acquiring unit, S20 corresponds to the processing as the extracting unit, S30 and S21 correspond to the processing as the device-system coordinates unit, and S30, S220, S230, S320, S330, and S340 correspond to the processing as the estimating unit.

What is claimed is:

1. An axial deviation estimating device that estimates an axial deviation angle of a radar device mounted on a mobile body, comprising:
    an acquiring unit that acquires, for each of a plurality of reflection points detected by the radar device, reflection point information including at least a horizontal angle and a vertical angle, which are azimuth angles of the reflection point that are obtained with reference to a beam direction being a direction along a central axis of a radar beam, and a distance between the radar device and the reflection point;
    an extracting unit that extracts, based on at least the reflection point information, at least one road surface reflection point from among the plurality of reflection points that has been detected due to reflection by a road surface;
    a device-system coordinates unit that specifies, based on the reflection point information, device-system coordinates for each road surface reflection point that represent three-dimensional coordinates based on a coordinate axis of the radar device; and
    an estimating unit that estimates the axial deviation angle using a relational expression that holds between at least one unknown parameter, which includes the axial deviation angle of a coordinate axis of the radar device from a target axis which is at least one of a horizontal axis and a traveling direction axis constituting the coordinate axes of the mobile body, and at least one element included in the device-system coordinates of the road surface reflection point,
    wherein the estimating unit estimates the axial deviation angle based on at least one parameter of a line approximated by a distribution of the device system coordinates of the road surface reflection points in a projection plane orthogonal to the target axis.

2. The axial deviation estimating device according to claim 1, wherein
    the estimating unit uses the relational expression, which is a relational expression that holds between two unknown parameters including one axial deviation angle, and two elements included in the device-system coordinates, to estimate the axial deviation angle included in the unknown parameters.

3. The axial deviation estimating device according to claim 1, wherein
    the estimating unit uses the relational expression, which is a relational expression that holds between one unknown parameter that represents the axial deviation angle, a mounting height of the radar device, and two elements included in the device-system coordinates, to estimate the axial deviation angle included in the unknown parameter.

4. The axial deviation estimating device according to claim 3, wherein
    the mounting height is stored in advance in a storage device mounted on the mobile body, and
    the estimating unit estimates the axial deviation angle based on the mounting height stored in advance in the storage device.

5. The axial deviation estimating device according to claim 3, wherein
    the mobile body includes a sensor that detects a position of the radar device, and
    the estimating unit estimates the axial deviation angle based on the mounting height detected by the sensor.

6. An axial deviation estimating device that estimates an axial deviation angle of a radar device mounted on a mobile body, comprising:
    an acquiring unit that acquires, for each of a plurality of reflection points detected by the radar device, reflection point information including at least a horizontal angle and a vertical angle, which are azimuth angles of the reflection point that are obtained with reference to a beam direction being a direction along a central axis of a radar beam, and a distance between the radar device and the reflection point;
    an extracting unit that:
    determines whether the mobile body is stable with respect to the road surface; and
    extracts, based on at least the reflection point information and when it is determined that the mobile body is stable with respect to the road surface, at least one road surface reflection point from among the plurality of reflection points that has been detected due to reflection by a road surface;
    a device-system coordinates unit that specifies, based on the reflection point information, device-system coordinates for each road surface reflection point that represent three-dimensional coordinates based on a coordinate axis of the radar device; and an estimating unit that estimates the axial deviation angle using a relational expression that holds between at least one unknown parameter, which includes the axial deviation angle of a coordinate axis of the radar device from a target axis which is at least one of a horizontal axis and a traveling direction axis constituting the coordinate axes of the mobile body, and at least one element included in the device-system coordinates of the road surface reflection point.

7. The axial deviation estimating device according to claim 6, wherein the estimating unit uses the relational expression, which is a relational expression that holds between two unknown parameters including one axial deviation angle, and two elements included in the device-system coordinates, to estimate the axial deviation angle included in the unknown parameters.

8. The axial deviation estimating device according to claim 6, wherein the estimating unit uses the relational expression, which is a relational expression that holds between one unknown parameter that represents the axial deviation angle, a mounting height of the radar device, and two elements included in the device-system coordinates, to estimate the axial deviation angle included in the unknown parameter.

9. The axial deviation estimating device according to claim 8, wherein the mounting height is stored in advance in a storage device mounted on the mobile body, and the estimating unit estimates the axial deviation angle based on the mounting height stored in advance in the storage device.

10. The axial deviation estimating device according to claim 8, wherein the mobile body includes a sensor that detects a position of the radar device, and the estimating unit estimates the axial deviation angle based on the mounting height detected by the sensor.

* * * * *